Patented Nov. 5, 1929

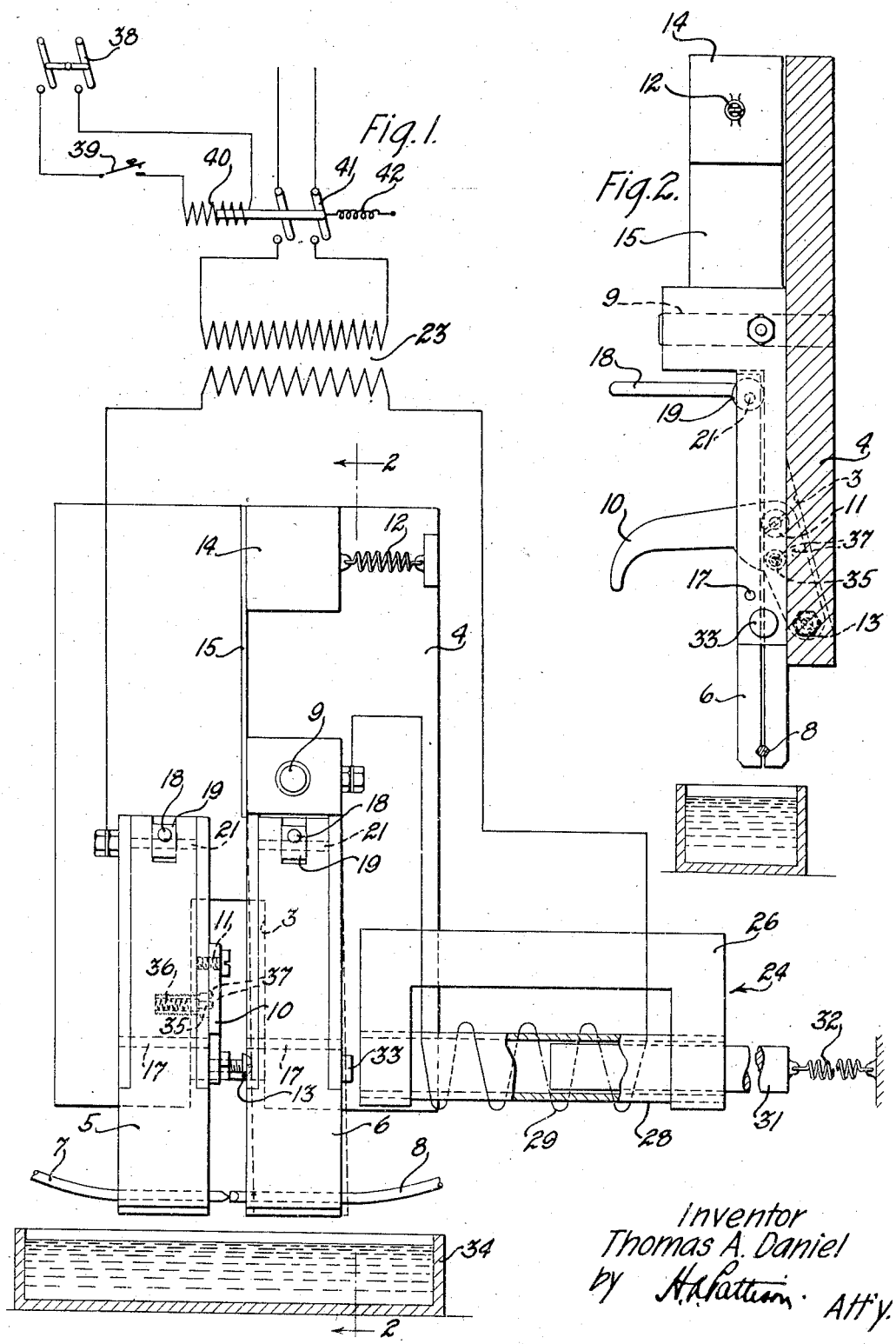

1,734,716

UNITED STATES PATENT OFFICE

THOMAS ARCHIE DANIEL, OF MAYWOOD, ILLINOIS, ASSIGNOR TO WESTERN ELECTRIC COMPANY, INCORPORATED, OF NEW YORK, N. Y., A CORPORATION OF NEW YORK

APPARATUS FOR WELDING

Application filed April 27, 1927. Serial No. 186,972.

This invention relates to an apparatus for welding, and more particularly to an apparatus for welding copper wires or rods.

In the welding of materials, such as copper wires, difficulty has been experienced in preventing the material from becoming overheated at and in the vicinity of the weld which results in a weakened physical structure of the metal due to a molecular change in material known in copper practice as "burnt copper" which may render the material brittle so that it would be difficult to draw the wires to fine sizes without breaking at the point where the weld was made.

An object of the present invention is to provide a welding apparatus for producing a strong and ductile weld which will overcome the above mentioned difficulties.

The invention contemplates the provision of a welding apparatus in which the temperature of the parts to be welded is accurately controlled in accordance with a predetermined program by means of a variable inductance in the welding circuit so that the welding operation will be completed in the least possible time to avoid the deleterious effects which appear to accompany high temperatures of long duration. In accordance with one embodiment of the invention, a movable core of an inductance is so arranged as to gradually and smoothly reduce the amount of current in the welding circuit in attaining the desired temperature after which the movable core imparts a percussive blow to one of the jaws holding the parts to be welded to upset the weld and adjoining material.

It is believed that a better understanding of the invention may be had by reference to the following description taken in conjunction with the accompanying drawing, in which Fig. 1 is a front elevation of the welding apparatus with a diagrammatic illustration of the welding circuit, and Fig. 2 is a sectional view taken on line 2—2 of Fig. 1.

Referring to the drawing in which the same reference characters designate similar parts in the several views, a base 4 supports two jaws 5 and 6 between which the wires or rods 7 and 8 to be welded are clamped and held in abutting relation. In order to insure a uniform contact between the wires at the beginning of each welding operation, the ends of the wires are cut to a wedge shape and the wedge-shaped edges are abutted at right angles as shown in Fig. 1. The jaw 5 is mounted in fixed relation to the base, while the jaw 6 is mounted on a pivot 9 for the purpose of allowing a relative movement between the jaws holding the wires 7 and 8, and a spring 12 exerts a pressure between their ends through a weight 14 which is supported on the jaw 6 by means of a spring 15. The function of the weight 14 will be described in connection with the operation of the apparatus. The distance between the jaws at the beginning of the welding operation may be accurately adjusted by means of a lever 10 which is pivoted at 11 on the jaw 5. The base 4 is recessed at 3 to permit the lever to turn about its pivot. An adjustable screw 13 is carried by the lower arm of the lever, the round head of which acting as a cam engages the side of the jaw 6 when the lever 10 is raised to move the jaw 6 to the dotted line position shown in Fig. 1. The jaw 5 is provided with a plunger 35 which is urged by a spring 36 against the lever 10 to engage one of two depressions 37 in the lever 10 to retain the lever in either of two positions. The upper member of each jaw is pivoted on a pin 17 and may be moved to clamp a wire by means of a lever 18 adapted to rotate a cylinder 19 eccentrically mounted in the upper jaw member on a pin 21 and the cylindrical surface of which engages the lower jaw member pivoting the upper jaw member about the pin 17 to clamp the wire. In placing the wires 7 and 8 in the welding jaws the lever 10 is first raised pushing the jaw 6 to its outermost position. The wires are then inserted in the jaws in such a manner that their wedge-shaped ends abut to form a point contact and the lever 10 is then moved downwardly to release the jaw 6 and allow the spring 12 to exert a pressure on the abutting ends of the wires.

The apparatus comprises two circuits, a welding circuit and a control circuit therefor. The control circuit which is connected to any suitable source of energy (not shown) by a switch 38 includes a push button switch 39, the closing of which causes a magnetic relay 40 to be energized to close a switch 41 in the welding circuit against the action of a spring 42 connecting the welding circuit to any suitable source of current (not shown). When the push button switch 39 is released, the spring 42 tends to reopen the welding circuit. The welding circuit includes a transformer 23, the secondary of which includes the welding jaws and a variable inductance current control element 24. The variable inductance control element comprises a U-shaped yoke 26 of magnetic material provided with two circular apertures in which a cylindrical tube 28 of non-magnetic material is secured. The tube serves as a support for a coil 29 which comprises a few turns of a heavy conductor, and also as a guide or channel in which a movable core 31 of magnetic material, such as iron, may move. The mass of the core 31 is such that its inertia will retard its movement from its retracted position a sufficient length of time after the secondary circuit is energized to complete the welding operation before its movement completes the magnetic circuit of the variable inductance and reduces the current in the secondary circuit to about one-fourth of its initial value to interrupt the welding action. A spring 32 tends to return the core to its retracted position when the welding circuit is deenergized.

In order to magnetically blow out or expel any material which may become molten before the major portion of the material which is to form the welded joint attains the proper temperature, the inner sides of the welding jaws are made parallel and spaced closely together in order to form a sharp, U-shaped bend in the vicinity of the weld. When a large current passes through this bend there is a tendency for the current carrying parts to be forced outwardly in a radial direction. The heavy current which it is possible to use by this device due to the current control element is sufficient to magnetically blow out any material which may become molten during the welding operation. When the material which is to form the welded joint has attained the proper temperature, the core 31 will strike a projecton 33 on the jaw 6 which is arranged in the path of the movable core, bringing the parts to be welded firmly together and upsetting the weld and adjacent material.

During the entire welding process, the parts being welded are submerged in a non-oxidizing liquid such as water contained in a vessel 34 which is raised until the portion of the jaws clamping the material is immersed to prevent overheating and oxidizing of the parts being welded, some of which, such as copper, have a strong affinity for oxygen at high temperatures.

The operation of the apparatus will be described as applied to the welding of copper wires in a non-oxidizing agent of water. The wires to be welded are prepared by providing them with wedge-shaped edges and are then firmly clamped in their jaws in such a manner that the wedge-shaped edges are at right angles making a point contact between the edges. The vessel 34 is now raised until the wires are immersed in the liquid contained therein and the push button switch 39 is closed causing the switch 41 in the welding circuit to be closed. On account of the low impedance of the secondary circuit due to the retracted position of the core 31 of the variable inductance, a heavy current will flow through the abutting wires. The resistance at the point contact between the abutting wires will be comparatively high and the ends of the wire will become fused. The magnetic blow-out described will tend to remove all of the molten metal from the ends of the wires leaving a gap therebetween due to the fact that the inertia of the weight 14 prevents the spring 12 from maintaining the ends of the wires in contact. The heat generated in the gap is sufficient to instantaneously bring the wires to a high temperature and when this occurs the movable core of the variable inductance will have moved to such a position as to considerably decrease the current in the secondary circuit to avoid the danger of overheating the material adjacent the gap. After the current in the secondary has been substantially decreased there will be a short interval before the core 31 strikes the projection 33, during which time the ends of the wires will have an opportunity to cool to a temperature slightly below the fusing temperature, since the copper is very brittle just at the fusing temperature. When the wires have attained the desired temperature, the core 31 strikes the projection 33 and brings the wires firmly together, upsetting the material and producing the effect of forging the material to improve its molecular construction.

While the parts being welded are immersed during the entire welding operation, there may be a slight formation of copper oxide formed by the heated copper and the free oxygen in the water, but on account of the eutectic nature of copper oxide, it will be in the molten state and be blown out by the magnetic blow-out with the molten copper.

A weld made in accordance with this invention and the material adjacent thereto closely resemble in molecular structure the original material and in drawing the material the welded parts may be drawn to the same size as the original material without exhibiting any weakness at or near the joint.

It will be understood that the embodiment of the invention herein described and illustrated is merely a convenient and useful form of the invention which is capable of many other modifications without departing from the spirit and scope of the invention.

What is claimed is:

1. In a welding apparatus, a welding current control means comprising an inductance, and means for varying the impedance of said inductance in response to the current value and for imparting a percussive blow to the parts to be welded.

2. In a welding apparatus, a welding circuit, an inductance in said circuit, a core for said inductance movable in response to the energization of the circuit for varying the impedance of the circuit, said movable core having a predetermined mass to control its acceleration, and means in the path of said core for communicating an impact of the core with said means to the parts to be welded.

3. In a welding apparatus, a welding circuit, an inductance in said circuit, a core for said inductance movable in response to the energization of the circuit for varying the impedance of the circuit, said core being movable a predetermined distance to limit the time of its movement, and means in the path of said core for commmunicating an impact of the core with said means to the parts to be welded.

4. In a welding apparatus, a welding circuit, an inductance in said circuit, a movable core for said inductance having a predetermined mass and movable a predetermined distance to obtain a predetermined current control, and means in the path of said core for communicating an impact of the core with said means to the parts to be welded.

5. In a welding apparatus, a welding circuit including means for abutting the parts to be welded, an inductance in said circuit, a core for said inductance movable in response to the energization of the circuit for varying the impedance of the circuit, and means in the path of said core for communicating an impact of the core with said means to the abutting parts being welded.

6. In a welding apparatus, a welding circuit including means for abutting the parts to be welded, and means for varying the impedance of the circuit and for imparting a percussive blow to the abutted parts being welded.

7. In a welding apparatus, a welding circuit including means for abutting the parts to be welded, and magnetically operated means for varying the impedance of the circuit and for imparting a percussive blow to the abutted parts being welded.

8. In a welding apparatus, a welding circuit including clamping means, one of which is movable for abutting the parts to be welded, an inductance unit in said circuit comprising a U-shaped yoke, a tube of non-magnetic material across the ends of the yoke, an inductance coil wound on the tube, and a core of magnetic material movable within the tube in response to the energization of the circuit to vary the impedance of the circuit, said core having a predetermined mass and being movable a predetermined distance to reduce the current value to below that required for welding, and means in the path of said core for communicating an impact of the core with said means to the abutting parts being welded.

9. In a welding apparatus, a variable inductance unit comprising a U-shaped yoke of magnetic material, a tube of non-magnetic material across the ends of the yoke, an inductance coil wound on the tube, and a core of magnetic material movable within the tube to vary the impedance of the inductance unit, and means in the path of said movable core for communicating an impact of the core with said means to the parts being welded.

10. In a welding apparatus, a welding circuit, and means responsive to the energization of the circuit to vary the current value thereof and to impart a percussive blow to the parts to be welded.

11. In a welding apparatus, a welding circuit, an inductance in said circuit, and a core for said inductance movable in response to the energization of the circuit for varying the impedance of the circuit to reduce the current to a value below that required for a weld, said movable core having a predetermined mass to control its acceleration so that a weld is effected before the core is moved in response to the energization of the circuit.

In witness whereof, I hereunto subscribe my name this 16th day of April A. D., 1927.

THOMAS ARCHIE DANIEL.